United States Patent [19]

Sand

[11] 4,212,098
[45] Jul. 15, 1980

[54] METHOD AND APPARATUS FOR ALIGNING A BEARING

[75] Inventor: William T. Sand, Curtice, Ohio

[73] Assignee: Eltra Corporation, Toledo, Ohio

[21] Appl. No.: 857,538

[22] Filed: Dec. 5, 1977

[51] Int. Cl.$^2$ .......................... B23P 3/00; B23P 19/04
[52] U.S. Cl. ........................................ 29/460; 29/271;
29/464; 29/724; 308/194
[58] Field of Search .................. 29/149.5 R, 460, 271,
29/464, 274, 724; 308/189 R, 189 A, 194, 195,
197, 198

[56] References Cited

U.S. PATENT DOCUMENTS

| | | |
|---|---|---|
| 1,638,029 | 8/1927 | Guidi . |
| 1,668,105 | 5/1928 | Delaval-Craw et al. ......... 308/189 R UX |
| 1,705,281 | 3/1929 | Batt .................... 308/189 A |
| 1,730,896 | 10/1929 | Norton . |
| 1,758,667 | 5/1930 | Hughes ............... 308/189 R |
| 1,978,527 | 10/1934 | Erickson ............ 308/189 R X |
| 2,594,810 | 4/1952 | Schaub et al. ........... 308/189 R UX |
| 2,656,227 | 10/1953 | Comery ............... 308/189 R |
| 2,659,637 | 11/1953 | Barr . |
| 2,682,435 | 6/1954 | Rien et al. . |
| 3,033,621 | 5/1962 | Spencer et al. . |
| 3,203,742 | 8/1965 | McCarty et al. . |
| 3,467,452 | 9/1969 | McElroy . |
| 3,476,454 | 4/1969 | Markey . |
| 3,518,745 | 7/1970 | Gray et al. ............... 29/271 |
| 3,521,494 | 7/1970 | Carrigan ............... 29/271 X |
| 3,660,989 | 5/1972 | Pitner . |
| 3,751,534 | 8/1973 | Oxley . |
| 3,842,477 | 10/1974 | Hunkeler ............... 29/271 |
| 3,866,986 | 2/1975 | Halper . |
| 3,875,762 | 4/1975 | Tampalini . |
| 3,900,732 | 8/1975 | Costales ............... 29/271 X |
| 3,937,538 | 2/1976 | Zimmer et al. . |
| 3,941,436 | 3/1976 | Kazama . |
| 3,949,919 | 4/1976 | Takei . |
| 3,963,285 | 6/1976 | Kellstrom . |
| 3,977,740 | 8/1976 | Struttmann . |
| 3,998,505 | 12/1976 | Frost et al. ............... 308/189 R X |
| 4,017,128 | 4/1977 | Setele ............... 308/189 R X |

*Primary Examiner*—Charlie T. Moon
*Attorney, Agent, or Firm*—Robert H. Johnson; Joel I. Rosenblatt; James P. DeClercq

[57] ABSTRACT

The output shaft of an electric motor is supported by a ballbearing mounted on the motor end plate. The outer race of the ballbearing is positioned in a cup having a semispherical portion. The motor end plate includes a socket portion to receive the semispherical portion of the cup. A retainer plate of spring metal is mounted on the motor end plate. A plurality of resilient finger-like extensions on the retainer plate press the outer race in the cup and the cup in the socket. The cup swivels in the socket. By reason of that, the outer race can be shifted with respect to the inner race, and the entire bearing can be shifted with respect to the motor end plate. A collar, containing a plurality of legs, the ends of which define a plane perpendicular to the shaft axis, is slid down the shaft. The legs pass through a like plurality of holes located in the end plate to contact the cup. Pressing the legs against the cup causes it to swivel in the socket until all the legs contact the cup. When this happens, the inner and outer races are coplanar and therefore aligned. The collar is then removed and filler material is injected into the holes to secure the cup in place on motor end plate.

8 Claims, 8 Drawing Figures

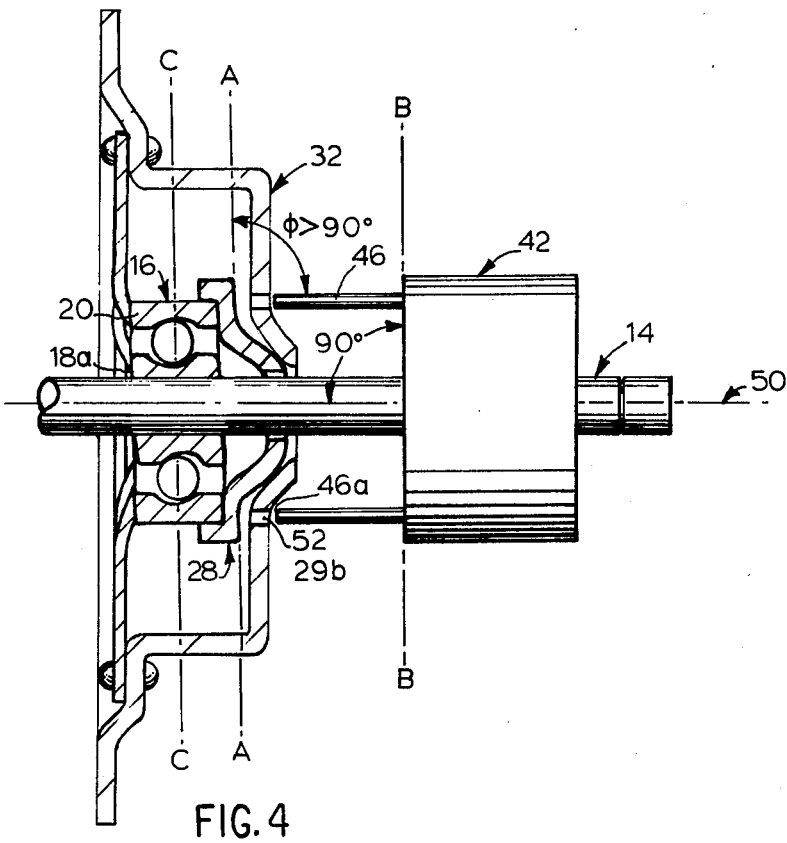
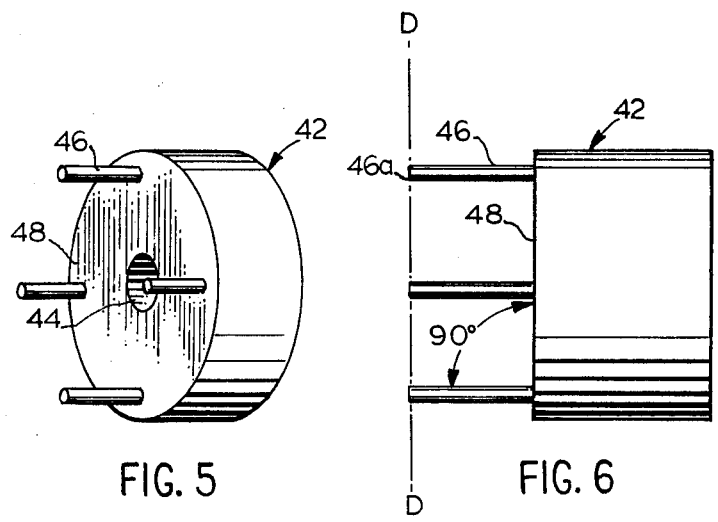

METHOD AND APPARATUS FOR ALIGNING A BEARING

BACKGROUND OF THE INVENTION

The following invention relates to ballbearings, and in particular, an apparatus for mounting and precisely aligning such bearings.

Contained in a ballbearing are inner and outer races, separated by a plurality of balls that roll in opposed grooves in each of the races. The inner race typically receives a shaft or journal, and the outer race is mounted on a structure that supports the shaft load. So as to achieve maximum bearing service life, the inner and outer races should be properly aligned so that the two races are parallel to one another with respect to a common center line. If however, the races are not parallel, the path the bearing balls follow as they move around the shaft is not on a plane perpendicular to the common center line. As a result, the balls move from one side of the race groove to the opposite side and therefore have both movement around the shaft axis and back and forth parallel to the common center line. This condition is often referred to as bearing angular misalignment and can produce premature bearing spalling, which results from the combination of bearing angular misalignment and the consequentual reduction in ball loading area. Another product of unwanted bearing angular misalignment is smearing. That occurs as the balls move from loaded to unloaded positions in the race grooves. Hence, the wear on the bearing components from bearing angular misalignment is thus significantly accelerated, reducing the life of the bearing.

If the outer race support is on a plane that is substantially nonperpendicular to the shaft axis, a bending moment is produced between the inner and outer races. As a result, the bearing will be angularly misaligned and a torque relationship between the inner and outer races will also exist, which is transmitted through the balls to the races along the plane of the shaft axis, that being the bearing common center line. The engendered nonparallel relationship between the race grooves, combined with the increased ball loading arising from the reduced contact area and bending moment, enlarges the destructive forces exerted on the balls and race grooves, further accelerating spalling and smearing. In addition, the increase in loading on the bearing together with the reduction in the ball load carrying surface, increases the chances for damage to the bearing from shocks and blows sustained during its installation and subsequent storage. This is generally referred to as brinelling, and results from the plastic flow in the race grooves from the excessive stresses applied thereto by the balls when they are stationary. Consequently, angular misalignment, when combined with inter-race torque, further increases bearing wear and the chances of premature failure.

In the prior art, self-aligning bearings are used to compensate for angular misalignment. These bearings are typically cut to have spherical outer races that swivel in the bearing supporting structure. In small electric motors, for example, the socket is on a removable motor end plate. When the plate is mounted on the motor frame, the socket permits the plate to swivel with respect to the shaft and bearing, which eliminates at least a portion of the inter-race torque that otherwise arises from the bending moments if the plate did not swivel. Nevertheless, the inter-race torque is not completely eliminated because a certain amount of friction exists between the outer race and the socket which generates a moment opposing the swivel movement of the plate. Hence, for the plate to swivel, the moment must be overcome by an equal and opposite moment exerted between the races through the balls. The opposing moment thus creates inter-race torque, which is present after the plate swivels. Furthermore, the opposing moment arises from the angular misalignment between the races, and consequently, the same results are produced as in the case of nonself-aligning bearings, specifically: spalling and brinelling. Needless to say, these negative results are particularly significant if the friction between the outer race and the socket is high, since that increases the moment and concomitant torque.

Consequently, self-aligning bearings simply limit rather than eliminate the inter-race torque condition. And of equal importance, even if the inter-race torque is small the races are at their maximum angle of misalignment; that is, the balls are pressed against the opposite sides of the grooves on diametrically opposite sides of the bearing. It is particularly noteworthy that angular misalignment is present in all prior art self-aligning bearings to some degree, and hence the path of the balls as they roll is skewed or nonperpendicular to the shaft axis, which, as mentioned earlier, substantially increases the wear on the bearing parts.

So it can be observed that although self-aligning bearings can serve to reduce the torque between the inner and outer races arising from the bending moments, they do not necessarily limit it to allowable limits. Of equal importance, because traditional self-aligning bearings do not completely eliminate the inter-race torque, angular misalignment is not eliminated. Finally, since the outer race on such bearings is generally spherically cut, they are considerably more expensive than standard bearings having simple ring-like outer races.

SUMMARY OF THE INVENTION

In the present invention, the disadvantages of a self-aligning bearing are obviated; nor is there a need for specially fabricated bearing components. In the instant invention, a conventional bearing having ring-like inner and outer races is placed in a cup containing a semispherical portion that fits into a conical socket, which in the case of a small electric motor as depicted herein, is included in the removable motor end plate. With the bearing and cup mounted in the socket, a plate, constructed of spring material is fastened to the motor end plate. This plate contains a plurality of fingers that extend radially inward towards the shaft so as to contact and press the outer race in the cup, while simultaneously also pressing the cup in the socket. The entire bearing can be swiveled in the motor end plate by way of the cup.

The torque required to swivel the bearing on the end plate is determined by the tension of the fingers applied to the outer race. The reason for this is that the fingers on diametrically opposite sides of the bearing act in opposition to each other and so as the bearing or plate is swiveled, the tension applied by one set of fingers to the outer race increases as the tension on the diametrically opposite side decreases. That keeps the net force between the cup and end plate substantially constant and parallel to the shaft axis. The frictional force between the cup and socket is therefore substantially constant regardless of the cup position and deflection of the fingers and, the maximum force necessary to swivel the bearing, or conversely swivel the plate with respect to the bearing, is determined solely by the finger tension and thereby presets the maximum inter-race torque while also supplying sufficient pressure to the cup and outer race to assure that it neither rotates or wobbles.

The assembly consisting of the motor end plate, the bearing, cup and spring plate, is fastened on to the motor frame to support one end of the motor shaft. The opposite end is supported on an end plate by a conventional self-aligning bronze bearing, or alternatively, a similar self-aligning bearing assembly. The outer race of the bearing and the cup swivel on the end plate to accommodate angular misalignment as the plate is mounted and fastened on the motor frame. A collar containing a plurality of legs is then slid down the motor shaft. These legs are parallel to the shaft axis and are of equal length and located with respect to each other so that their ends define a plane that is perpendicular to the shaft axis. These legs also correspond to a like number of holes in the motor end plate that provide access for the legs to the cup. As the cup is slid down the shaft, the legs enter the holes and contact the cup. If the inner and outer races are properly aligned, that is, the races are parallel all of the legs will contact the cup. But if the inner and outer races are not aligned, the outer race, and therefore the cup, are not perpendicular to the motor shaft axis, and as a result, only a few of the legs will establish contact with the cup. If the collar is slid down the shaft, under moderate pressure, those legs that contact the cup will cause it to shift into socket until all of the legs make contact. That can happen only if the outer race is perpendicular to the shaft axis and correspondingly parallel with the inner race, which is also on a plane perpendicular to the shaft axis by reason of the fact that it supports the shaft. Once properly aligned, with all angular misalignment thereby removed, a filler material is injected through the holes to fill the space between the cup and the sockets. This is done simultaneously with removal of the legs from the holes by injecting the filler through passages in the legs in a single manufacturing operation. The filler assures that the bearing remains in the properly aligned position.

Thus, an object of the present invention is to permit the use of standard low cost bearings in a self-aligning assembly particularly adapted for economical construction and manufacture.

Another object is to provide an apparatus, and method, to eliminate angular misalignment between the inner and outer races to assure that the paths the balls follow as they roll in the race grooves is on a plane perpendicular to the shaft axis to minimize uneven ball movement and resulting excessive bearing wear.

The foregoing, as well as other objects, features and benefits of the instant invention, will be evident to those skilled in the art from the following drawing, detailed description and claims wherein:

DESCRIPTION OF THE DRAWING

FIG. 4 is a cross-sectional view of the motor end plate with the bearing angularly misaligned and shown in a cross-sectional view, and the alignment collar positioned on the motor shaft.

FIG. 5 is a perspective view of the mounting collar.

FIG. 6 is a side view of the mounting collar.

DETAILED DESCRIPTION

Figure 1:
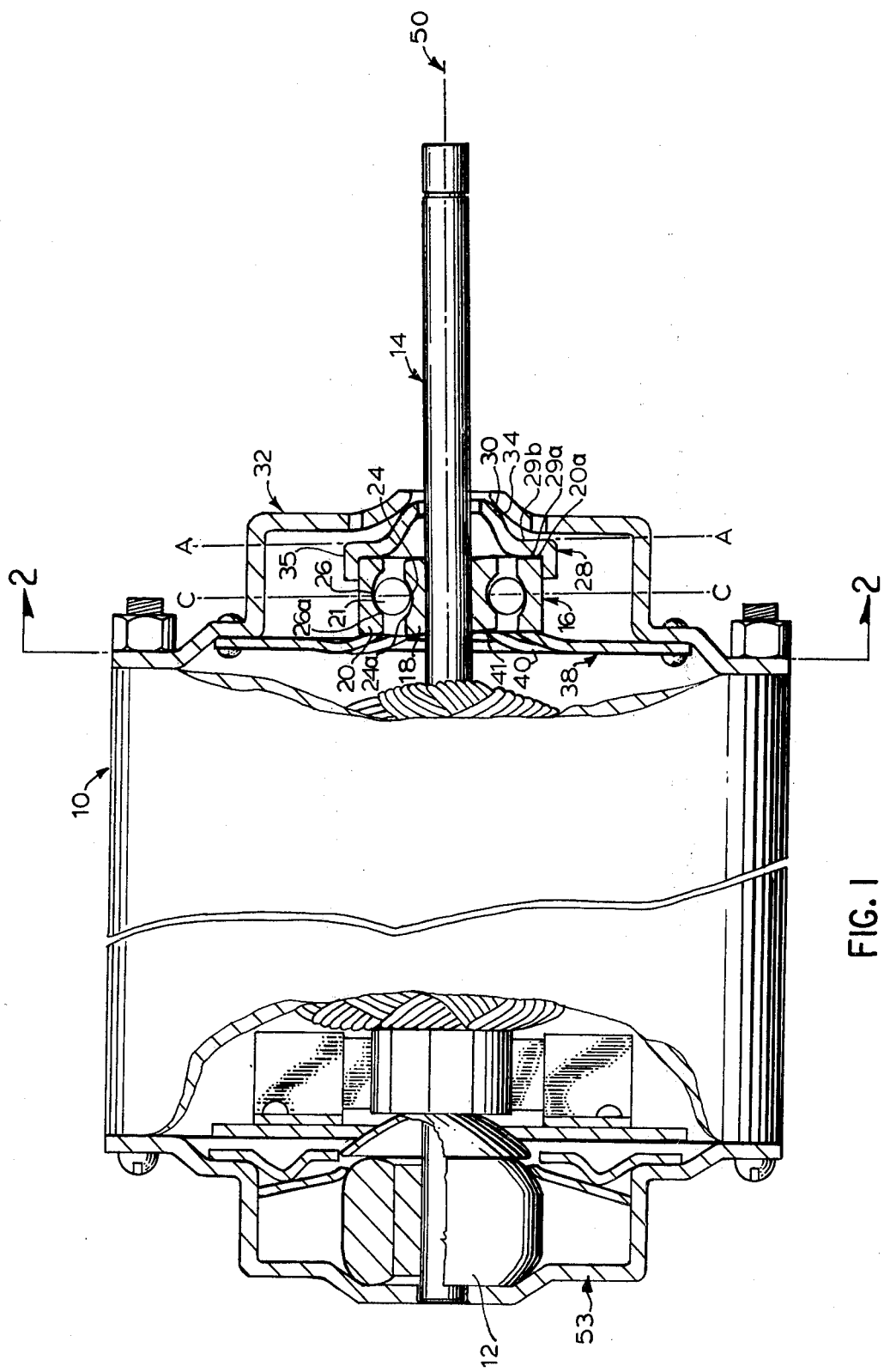
FIG. 1 shows an electric motor containing the self-aligning bearing of the present invention with the inner and outer races angularly misaligned.
Figure 2:
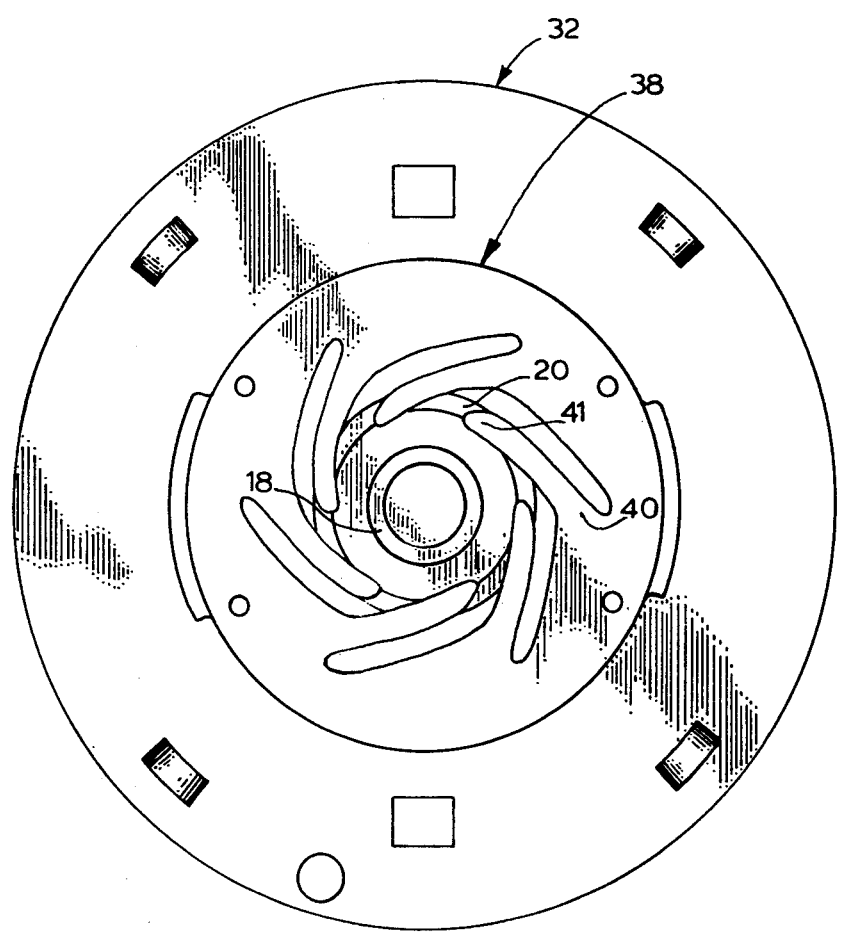
FIG. 2 is an elevational view of the end plate along line 2—2 in FIG. 1.

Reference is first made to FIG. 1 wherein an electric motor 10 that contains a bronze spherical bearing 12 supports one end of the motor shaft 14, which is supported at its opposite end by a conventional ring ball-bearing assembly 16 mounted in an apparatus according to the present invention. Ballbearing 16 is shown in an angularly misaligned configuration; that is, the inner and outer races 18, 20 are not perfectly parallel with respect to each other and the shaft axis 50 or center line, with the result being that the bearing ball 21 does not follow a path as it moves around the shaft that is on a plane C perpendicular to the shaft axis. It is important to note that bearing 16 as shown in the figures is not subjected to an inward to outward thrust directed along the shaft axis, which would force the ball 21 against either side of the race grooves 24, 26. If that thrust is not present, the grooves 24, 26 should be directly opposite each other. In contrast, however, if it is present, grooves 24, 26 will not be opposite each other, but nevertheless the races themselves should be parallel so that even though the balls 21 press against the sides of grooves 24, 26, the path they follow in moving around the shaft is on a plane perpendicular to the shaft axis. That ensures that the balls press against the same groove side at all times, eliminating ball movement parallel to axis 50.

As mentioned, bearing 16 is angularly misaligned in FIG. 1, and as a result ball 21 presses against opposite faces 24a, 26a, on race grooves 24, 26. As a result, as ball 21, which is representative of the plurality of balls included in a ballbearing, rotates around the shaft, it does so on a plane C that is not perpendicular to the shaft axis 50. Hence as it moves from the top to the bottom of the bearing, ball 21 moves from one side of the race grooves to the opposite side and thus increases the area in the race grooves exposed to the ball while also exposing the ball to sideward movement in the direction of the shaft axis. Both of those effects increase the stress on the bearing components and shortens overall bearing life. But by removing the angular misalignment in the manner described below, they are eliminated.

Figure 3:
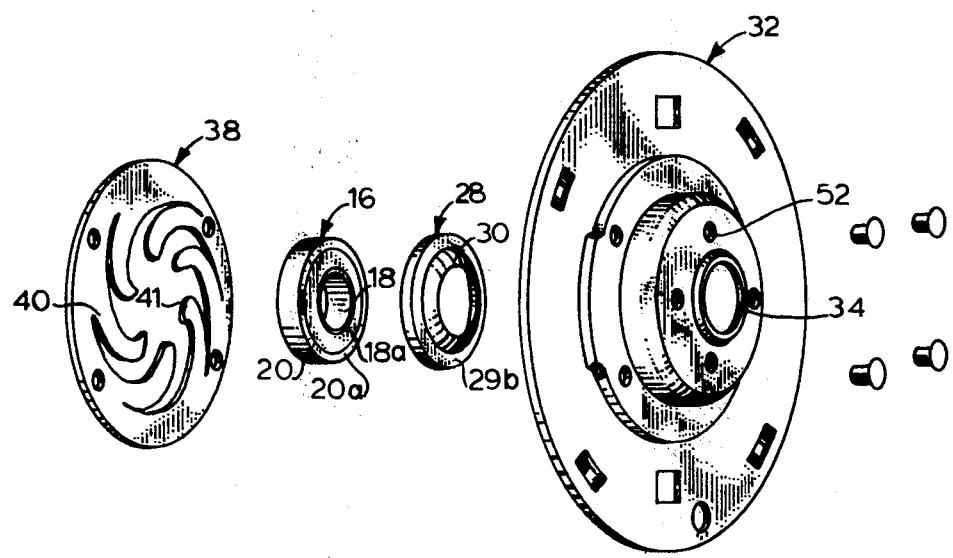
FIG. 3 is an exploded view of the motor end plate and the bearing assembly.

Continuing to refer to FIG. 1, ballbearing 16 is mounted in a circular cup 28 that includes a semispherical portion 30. The detail of cup 28 is shown in FIG. 3. The removable motor end plate 32 contains a conical socket portion 34 that receives the semispherical portion 30 of cup 28. By reason of that, plate 32 can be shifted around bearing 16 and the shaft 14 when it is fastened onto motor frame 54. That eliminates, at least to a certain degree, a high inter-race torque condition from the bending movement produced if end plate 32 and its opposite end plate 53 do not have a common center line along the shaft axis 50. The outer edge 35 of cup 28 receives the outer race 20 in a comparatively tight-fitting relationship, which insures that bearing 16 does not shift in cup 28. The outer race front surface 20a rests in cup 28 against a substantially peripheral flat surface 29a. As shown in FIG. 1, the inner race is completely detached from cup 28 by reason of its spatial relationship to spherical surface 30, and as a result outer race 20 can be shifted with respect to shaft 14, and inner race 16, by shifting cup 28 to the extent determined by the degree of movement ball 21 has in the race grooves 24, 26. The opposite side of surface 29a is surface 29b. Both surfaces are parallel to each other and surface 29 is on the plane A, which is perpendicular to outer race groove 26.

The complete assembly consisting of cup 28 and bearing 16 is constrained in socket 34 by a plate 38 that is comprised of spring-like material and a plurality of legs 40 extending radially inward pressing upon outer race 20. The precise configuration of plate 38 is shown in FIG. 3. It should be noted from FIG. 1 and the remaining figures as well, that the ends 41 of fingers 40 are bent so as to extend from the plane of plate 38 to contact outer race 20. This assures that sufficient pressure is applied to race 20 to hold it securely in cup 28 and simultaneously hold the cup in socket 34. The proper arm tension is predetermined, and is based upon the maximum desireable inter-race torque for the particular bearing necessary to avoid damage to the grooves prior to final alignment due to shock and blows during installation. Needless to say, the tension parameters also include consideration of the need to make certain that bearing 16 does not wobble or rotate in the cup to maintain a reliable alignment configuration.

Turning now to FIG. 4, end plate 32 is shown apart from motor 10 for present purposes only, to simplify explanation of the present invention and specifically the manner in which the present invention eliminates all inter-race torque and also places the inner and outer races in a parallel configuration eliminating angular misalignment. In actual practice, however, bearing 16 is aligned after motor 10 is completely assembled.

A cylindrical collar 42 is slid down shaft 14. Collar 42 contains a bore 44, as shown in FIG. 5, to receive shaft 14 as collar 42 is slid thereon. The bore 44 and shaft dimensions are ostensibly the same to assure that collar 42 does not wobble on shaft 14.

Viewing FIG. 5, collar 42 includes four legs 46 that extend from its front face 48. These legs are preferably spaced 90° apart and are of equal length and perpendicular to face 48, which is on plane B perpendicular to shaft 50. Consequently, plane D, defined by the ends 46a of the legs is also perpendicular to the shaft axis 50.

Legs 46 correspond to similarly situated holes 52 on plate 32, as shown in FIG. 3. As collar 42 is slid down shaft 14 each leg 46 enters a hole 52. However, by reason of the angular misalignment between the inner and outer races 18 and 20, as shown in FIG. 4, plane A is not perpendicular to the shaft axis, and therefore, is also not parallel to plane B. It follows logically that plane A is thus also oblique to the plane defined by the ends of legs 46 and thus the angle $\phi$ between plane A and legs 46 as shown is greater than 90°. By reason of this, as collar 42 is slid down the shaft 14 not all of the legs 46 contact surface 29b. Nevertheless, if pressure is applied to collar 42 directed along the shaft axis 50, cup 28, and outer race 20, will swivel in socket 34 until all four ends 46a contact surface 29b, as shown in FIG. 7.

Figure 7:
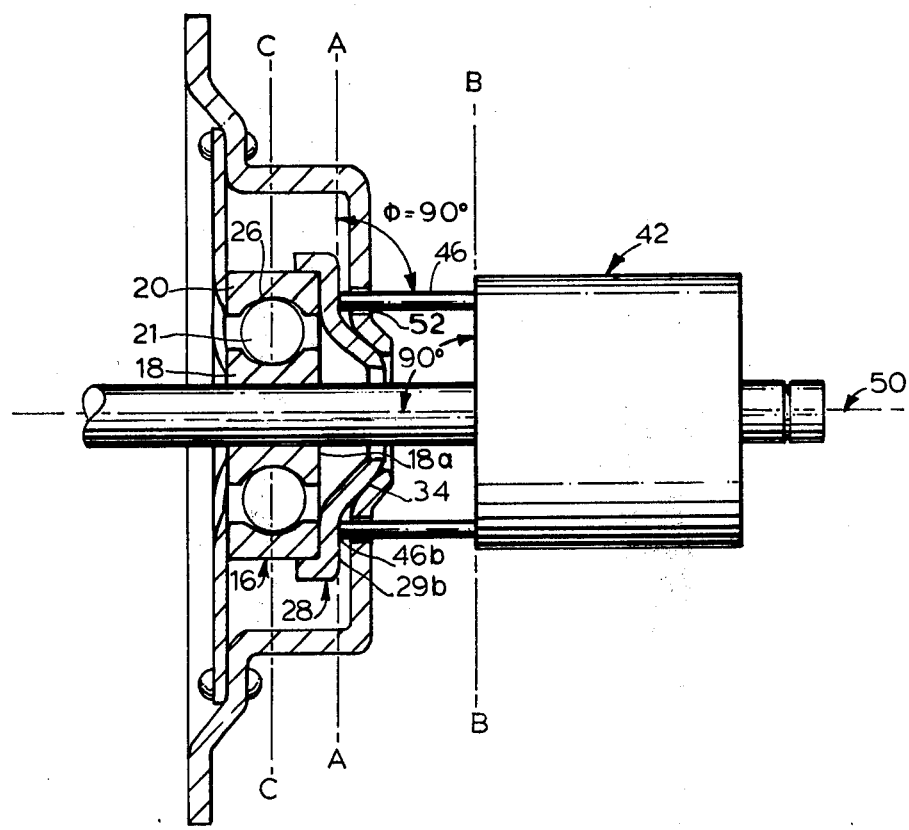
FIG. 7 shows the bearing angular misalignment removed by the alignment collar with all of the legs in contact with the cup.

It can be seen in FIG. 7, that when all of the ends 46a contact surface 29b, plane A is coplanar with the plane of the ends of legs 46 and thereby perpendicular to each leg, and $\phi = 90°$. Hence, plane A is perpendicular to the shaft axis. The angle between the outer race and plane A as noted earlier, is always 90°. Likewise, the angle between the face 18a on inner race 18 and the shaft axis is always 90°. Consequently, when plane A is perpendicular to the shaft axis 50, inner race 18 and outer race 20 are parallel with respect to the other. And by reason of that, ball 21 is disposed in the center of the race grooves 24, 26, as shown in FIG. 7. A most important facet to note is that with races 24, 26 parallel, ball 21 will move on a plane C which is perpendicular to the shaft axis 50. This is so even if there is thrusting of the races so that the grooves are not directly opposite; that is, the fact that the races are parallel still makes it certain that the path of ball 21 is perpendicular to shaft axis 50 at all times. It is obvious that with the races parallel there is no inter-race torque.

Figure 8:
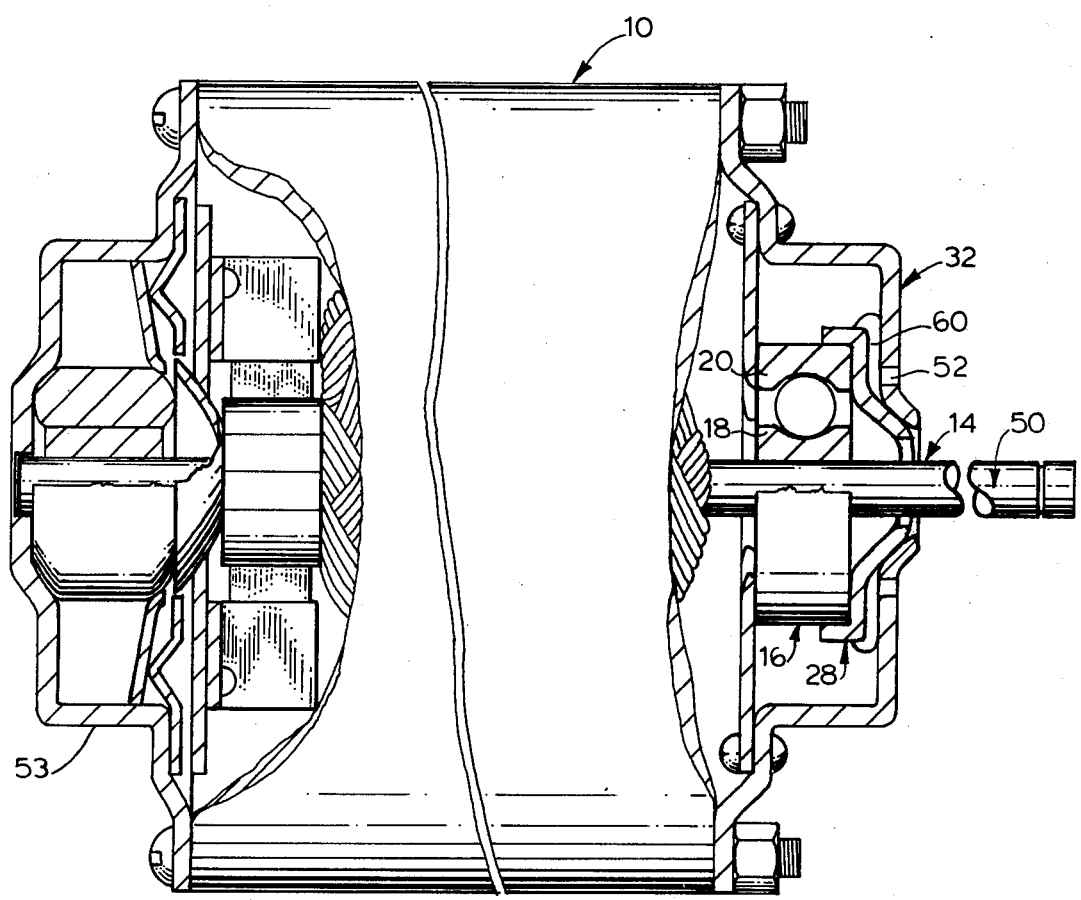
FIG. 8 shows the motor with the bearing properly aligned and the filler between the cup and plate.

As the collar 42 is removed, a filler material 60 is injected into the space between the cup 28 and plate 32 through holes 52. As shown in FIG. 8. It is preferable that the material be injected simultaneously with removal of the collar. This is most readily accomplished by providing bores, which are not shown, in each of the legs and attaching an apparatus to the collar which injects the filler material through the legs as the collar is removed. The apparatus can be responsive to the pressure applied to the collar to shift cup 28 so that when the pressure is near zero, which occurs just as the collar is removed, the filler 60 is automatically injected in a nearly single step. The filler 60, upon hardening, prevents any shifting of cup 28 and thereby any movement of outer race 20 with respect to inner race 20 thereby permanently establishing the parallel condition between both races.

It should be apparent, in view of the above that although a ballbearing has been shown utilizing the present invention, and in particular, the method for aligning the bearing, both are equally applicable and pertinent to roller or other related kinds of bearings. In addition, the method for aligning the bearing utilizing the alignment collar including the step of injecting bonding material between the bearing carrying fixture and the motor end plate is equally applicable to spherical bearings. That is, the alignment collar and related method can be employed in the same way as described previously with a self-aligning bearing having a spherically cut outer surface to shift the outer race with respect to the inner race to eliminate angular misalignment and torque and also to inject the filler material between the spherical outer race and its carrying structure to retain the outer race in the aligned position. Consequently, the method employing the alignment collar and filler material is best viewed as having value to all bearings having inner and outer races by providing a means for adjusting the inner and outer races to a parallel relationship and simultaneously retaining them in that relationship.

While I have described what is at present the preferred embodiment of my invention it should be obvious to those skilled in the art that there are numerous possible modifications and variations that can be made thereto which nevertheless embrace and capture its true scope and spirit. Consequently, it is intended that the following claims be construed to cover all such equivalent modifications and variations.

I claim:

1. A mounting apparatus for a bearing containing an outer race and an inner race, the inner race adapted to receive and support a shaft, in combination with apparatus for aligning said bearing, comprising:
- a first plate;
- a second plate;
- a cup adapted to swivel on a portion of the first plate, said cup receiving the outer race of the bearing to support the bearing on the first plate;
- first means disposed on the second plate for pressing the outer race into the cup and simultaneously pressing the cup into said first plate portion, whereby the first plate is adapted to swivel with respect to the bearing and the shaft axis; and
- second means for shifting the outer race with respect to the inner race by shifting said cup in said first plate until the outer race is parallel to the inner race.

2. The mounting apparatus described in claim 1, wherein:
- said plate includes a plurality of holes circularly located thereon around the shaft providing access to said cup therethrough; and
- said second means includes: a plurality of legs each of which enters one of said holes, the ends of said legs define a plane perpendicular to the shaft axis and inner race, and all of said ends contact said cup when the inner and outer races are parallel.

3. The mounting apparatus of claim 2, further comprising:
- filler material between said cup and said plate, and at least one of said legs is adapted to inject said filler material into the space between said cup and said plate as it is withdrawn from its corresponding said hole in said plate.

4. A method for mounting and aligning a bearing on a plate, the plate being removably fastened to a frame, the bearing consisting of an inner race adapted to receive and support a shaft and an outer race rotatably concentric therewith; comprising the steps of:
- inserting the bearing into a cup so that only the outer race contacts the cup, the cup being adapted to swivel in a socket on the plate;
- inserting the cup together with the bearing therein on the plate in the socket;
- fastening a second plate on the first mentioned plate, the second plate including a plurality of resilient arms which press the outer race into the cup and simultaneously the cup into said socket as said second plate is fastened in position;
- passing the shaft through the inner race, the cup, and the socket;
- positioning and fastening the first mentioned plate on the frame;
- sliding a collar down the shaft, the collar including a plurality of legs;
- establishing contact between the legs and the cup; and applying pressure to the cup by means of the legs to shift the cup in the socket until the outer race is on a plane perpendicular to the shaft axis.

5. A method for mounting and aligning a bearing mounted on a plate, the plate being removably fastened to a frame, the bearing consisting of an inner race adapted to receive and support the shaft and an outer race concentric therewith, comprising the steps:
- placing the bearing in a cup;
- placing the cup on the plate;
- resiliently pressing the bearing in the cup and the cup simultaneously on the plate;
- passing the shaft through the inner race, the cup, and the plate;
- fastening the plate on the frame; and aligning the outer race by shifting the cup on the plate.

6. The method described in claim 5, comprising the additional step:
- injecting a filler material between the cup and the plate.

7. The method described in claim 5, wherein the step of aligning the outer race by shifting the cup on the plate comprises the steps of:
- placing a collar including a plurality of legs, the ends of which define a plane perpendicular to the shaft axis, onto the shaft;
- sliding and pressing the collar on the shaft towards said cup so that said legs pass through the plate and bear against the cup, the plate having a plurality of apertures therethrough adapted to receive said legs.

8. An alignment tool to be used with bearings having inner and outer races wherein the inner race supports a shaft, and the outer race is received in a cup, comprising:
- a collar having a bore closely receiving a shaft that is slid down the shaft which includes a plurality of at least three circumferentially spaced parallel legs protruding axially therefrom, the ends of which define a plane perpendicular to the shaft axis, and all of said ends contact the cup when the inner race and the outer race are parallel with respect to the center line of the shaft.

* * * * *